June 2, 1931.  L. V. CASTO ET AL  1,807,963
GRAINING MACHINE
Filed May 17, 1928   6 Sheets-Sheet 1

Fig.-1

Inventors
Lloyd V. Casto
Guido Von Webern
By Bates, Macklin, Golrick & Tears
Attorneys

Patented June 2, 1931

1,807,963

UNITED STATES PATENT OFFICE

LLOYD V. CASTO, OF DETROIT, MICHIGAN, AND GUIDO von WEBERN, OF DAYTON, OHIO, ASSIGNORS TO OXFORD VARNISH CORPORATION, OF DETROIT, MICHIGAN, A CORPORATION OF MICHIGAN

GRAINING MACHINE

Application filed May 17, 1928. Serial No. 278,482.

This invention relates to a graining machine for applying a design, such as one simulating wood graining onto a blank, such as a metal panel. The object of the invention is to provide an improved and simplified machine in which the various parts are assembled and arranged for effective use on comparatively large blanks.

A machine similar in many respects to the present device may be found in the copending application of George E. Lang and Lloyd V. Casto, Serial No. 134,807, filed September 11, 1926.

The primary elements in common between the disclosure of said application and the present machine are, briefly: the pattern roll, suitably arranged for carrying an etched plate, a transfer roll for taking pigment off the etched plate, and a backing or impression roll for holding a blank to receive the transferred pattern from the transfer roll as the blank is passed through between the transfer and backing rolls. Other parts in common are doctor blades acting on the pattern roll and transfer roll to scrape used pigment from these rolls. A further feature in common is that the pigment scraped from the rolls is reclaimed and used over again, there being a storage reservoir and pigment circulating system, including a pump, to effect this.

A further object of the present invention is to provide mechanism whereby the rolls, particularly the pattern roll, may be very large and may be supported in such manner as to facilitate handling thereof to change or inspect the plate and various parts of the mechanism, ordinarily concealed by this roll.

A further specific object is to provide a feeding device capable of handling very large blanks, and conveying the blanks into coaction with the transfer and backing rolls in coordination with the pattern roll.

A further object is to provide a periodically acting feeding device which may be controlled in precise relation to the pattern on the pattern roll irrespective of the turned position of the pattern roll when placed in the machine.

In the use of very large rolls it is desirable that the cleaning device therefor (shown as doctor blades), be oscillated parallel to the axes of the rolls, in order to prevent wearing grooves in the rolls. A further object includes the provision of an improved and simplified device for oscillating the doctor blades.

Further objects and features of the invention will become apparent from the following description relating to the accompanying drawings, wherein I have shown my preferred form. The essential characteristics are summarized in the claims.

In the drawings, the main operating parts of the machine are shown as supported by side plates or standards 1 and 2. They may be connected by various cross members to form a rigid frame structure, for example, cross frame bars are shown at 4 and 5 near the base of the machine, and a cross frame bar 7 at the top of the machine.

The pattern roll is designated 10, the transfer roll 11, and the backing roll 12. The support for these rolls will now be described: 13 designates a shaft supported on the frame plates 1 and 2 when in operating position, the frame plates having bearing sockets to which the ends of the shaft are fitted. Pivoted socketed members 14, one being shown in Fig. 2, and providing with hand wheels 15 hold the shaft in place in its bearing and form part of the bearing. These pivoted members 14 may be swung down about their pivots 16 so as to release the shaft 13 when it is desired to move the roll 10 into an operative position in order, for example, to change the etched plate.

Figure 2:
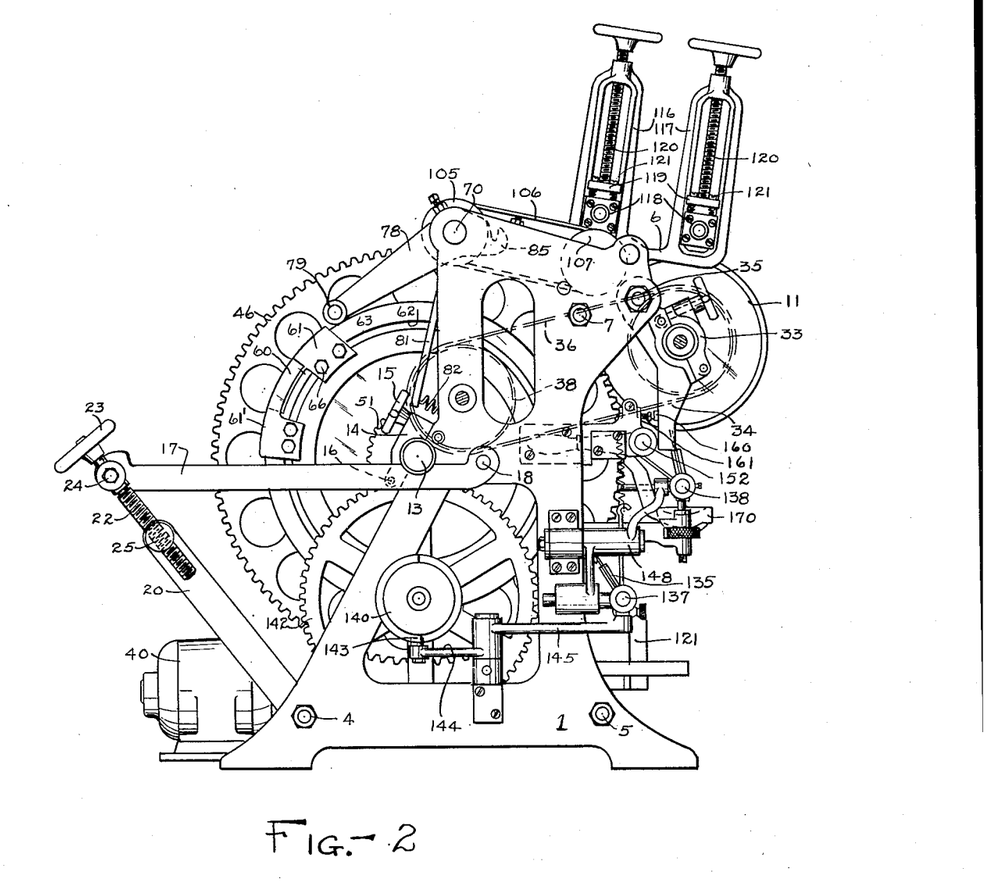
Fig. 2 is a side elevation thereof showing the right hand side of the machine, as viewed from the operator's position.
Figure 4:
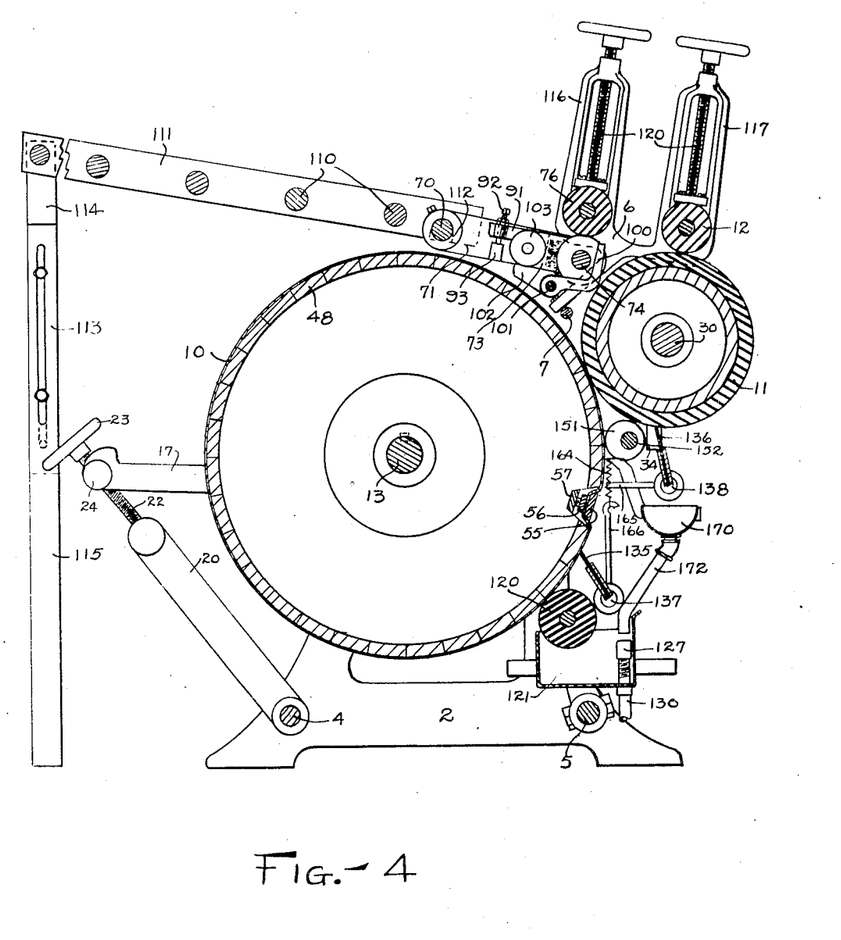
Fig. 4 is a cross sectional view centrally of the machine, as indicated by the line 4—4 on Fig. 1.

To facilitate such removal we provide pivoted supporting bars, shown in Figs. 2 and 4 at 17, pivoted at 18 to the frame member 1. The upper surfaces of the bars 17 are shown in contact with undercut grooves in the shaft, as at 19 (see Fig. 5). The grooves 19 guide the roll shaft when free from its bearings. The free ends of the bars 17 may be raised and lowered from the horizontal position shown in Fig. 2, in order that with the pivoted members 14 swung down, as above mentioned, the roll may be removed by gravity, that is, allowed to roll away from the machine on the inclined bars 17. Means for adjusting the ends of the bars 17 may comprise struts 20 pivoted, as on the cross bar 4, and carrying screws 22 arranged to be operated by hand wheels 23 pivotally fixed to the bars 17 in any suitable manner, as at 24. The ends of the screws are threaded into pivoted nuts 25 carried by the members 20. When the screws are lowered, the bars 17 will be inclined downwardly away from the machine to permit removal of the roll, and when the screw is raised, the bars 17 are inclined towards the machine for replacement of the roll. The members 14 may then be swung into place and locked by the screw 15.

Figure 1:
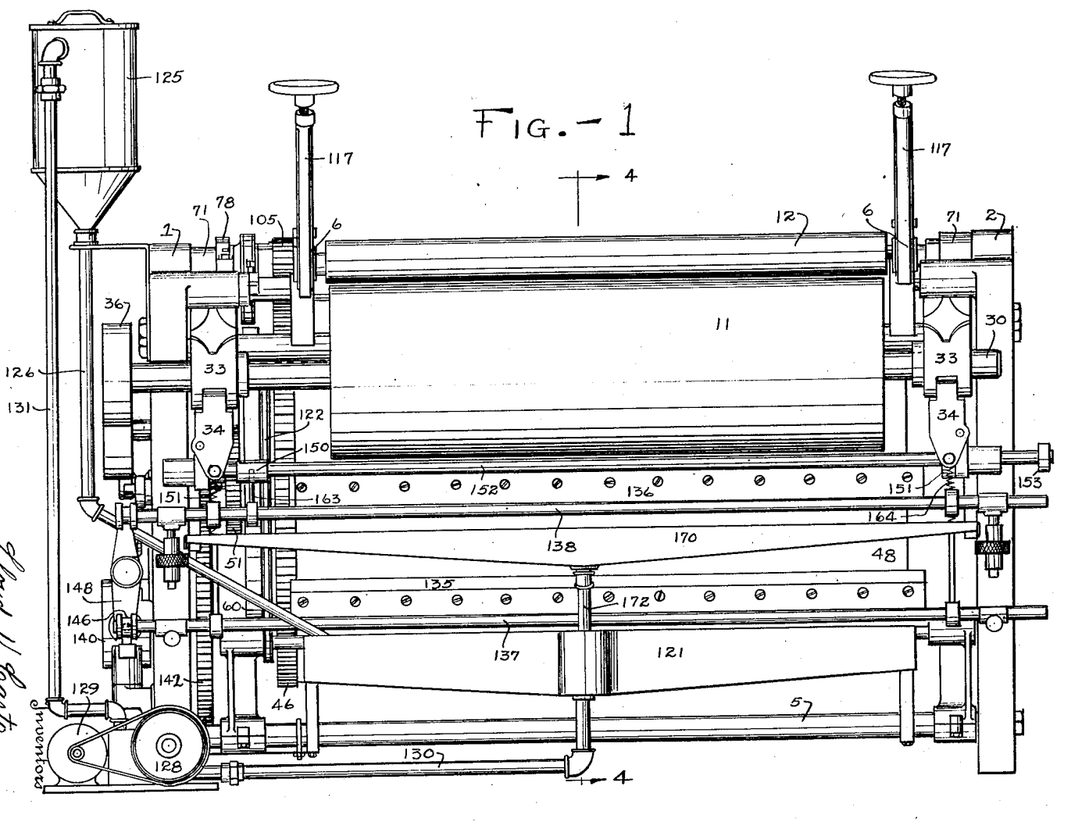
Fig. 1 is an end elevation of the entire machine in its preferred form.

The transfer roll 11 comprises, as shown in Fig. 4, a shaft 30, which, as shown in Figs. 1 and 2, projects into the embrace of bearing members 33 suitably mounted similarly to the members 14, for the pattern roll, and which are pivoted to depending swingable arms 34, the arms being in turn pivoted to the side frame plates 1 and 2, as on pins or bolts 35. The arrangement permits the transfer roll to be moved away from the pattern roll, out of contact therewith, whenever the machine stands idle. The transfer roll, as shown particularly in Figs. 1 and 2, may be driven from belt 36, the belt passing over pulleys 37 and 38, the latter being in geared relation with the pattern roll, as will be presently shown. The belt may be kept taut with an idler, or may be of such resilient characteristics that it will permit expansion when the roll 11 is drawn away from the pattern roll, as by swinging the arms 34 to the right, as shown in Fig. 2, since the necessary movement of the transfer roll to separate it from the pattern plate is very slight.

When the plate on the pattern roll carries a non-continuous design, the belt 36 may be eliminated, since in such case it is unimportant that the rolls 10 and 11 be synchronized, the frictional contact between the two rolls being sufficient for driving the roll 11. The backing roll 12 (Fig. 4) has no driving connection with the other rolls, above described, except through the intermediacy of the blank.

Figure 5:
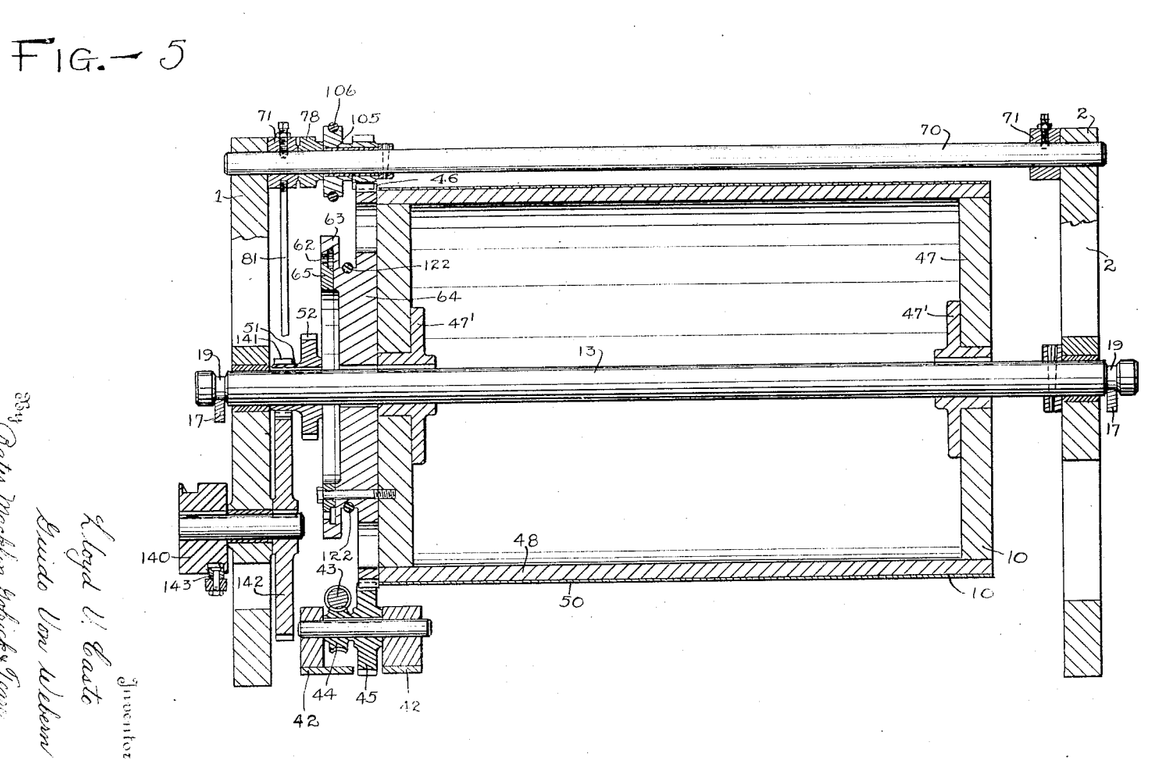
Fig. 5 is a vertical cross sectional view taken substantially along the line 5—5 on Fig. 3.

Suitable means for driving the two rolls, and other mechanism to be hereinafter described, may comprise an electric motor 40 mounted on a suitable base, such as 42, slung from the cross bars 4 and 5. The motor has its armature shaft connected to a worm 43 (Fig. 5), which drives a worm gear 44, the latter driving a spur gear 45. The gear 45 meshes with a large spur gear 46, shown as adapted to be attached to one end of the pattern roll by any suitable means. This roll, as shown in Fig. 5, comprises end plates 47 with hub members 47' keyed onto the shaft 13, and an outer plate support 48 carried at its end on the outer peripheral surfaces of the plates 47. The etched plate is shown at 50. Rigid with the shaft 13, as by means of a key, is a gear member 51 carrying gear teeth 52, the latter meshing with a smaller gear 53 (Figs. 2 and 3) supported on the frame member 1. This gear 53 may be keyed to, or otherwise made drivingly rigid with the pulley 38 for driving the transfer roll, as above mentioned.

The etched plate 50 is shown as embracing the portion 48 of the pattern roll, and having its ends secured between a pair of plates 55 and 56, which lie within the curved periphery of the roll, and which may be secured to a cross bar 57 secured at its ends in the plates 47, and to which the strips 55 and 56 are attached, as by a series of screws.

The feeding mechanism for blanks is governed in its action by the position of the roll 10 from a cam 60, which may be adjusted to any position circumferentially of the roll, in order for the feeding operation to take place in proper relation to the pattern, in other words, the proper relation to the design transferred from the pattern roll to the transfer roll. Other similar cams may be used if it is desired to print more than one blank for each rotation of the pattern roll. This adjustment of the feed controlling cam renders it unessential to place the roll 10 in any particular position with reference to the gear drive and feeding mechanism.

The cam comprises arcuate members 61 and 61' having portions arranged to overlie a T-slot 62 formed between a frame 63 on a plate 64 carried on one of the roll plates 47, and a separate ring 65. The members 61 and 61' are circumferentially extensible to vary the period of operation of the cam.

Suitable T-bolts indicated at 66, and carried by the members 61 and 61' enter the T-slot and serve to clamp the cam 60 in adjusted position.

Figure 6:
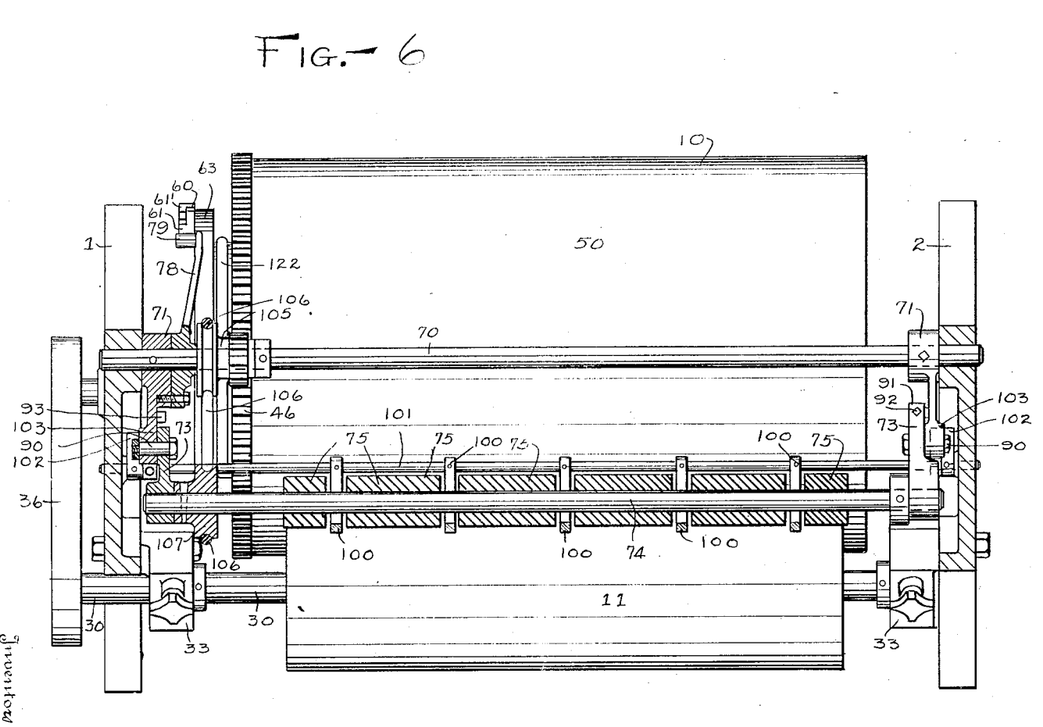
Fig. 6 is a sectional plane taken substantially along the line 6—6 on Fig. 3.

The feeding mechanism comprises a pivoted frame (see Figs. 3, 4 and 6) supported on a rock shaft 70 which has its ends freely turnable in the side frame members 1 and 2. Adjacent respective frame members 1 and 2, and inwardly therefrom are two arms 71, rigid with the rock shaft. At their rear ends the arms carry pivoted supporting members or arms 73 for a shaft 74. The shaft carries a series of feeding rollers designated 75. The frame, including the arms 71 and the roller supporting members 73, is shifted once for each rotation of the pattern roll (assuming one cam is used), so as to carry the rolls 75 downwardly away from a coacting roller 76 adjustably and resiliently mounted in members 6 rigid with the frame. This shifting is effected by a cam follower arm 78 adjustably rigid with one of the arms 71, and carrying a roller 79, which engages both portions 61 and 61' of the cam 60. Normally, the frame is held in position to urge the rolls 75 upwardly toward the roll 76, there being an arm 81 rigid with the frame arm 71, and which is acted on by a tension spring 82 anchored as at 83 to the side frame member 1.

Figure 3:
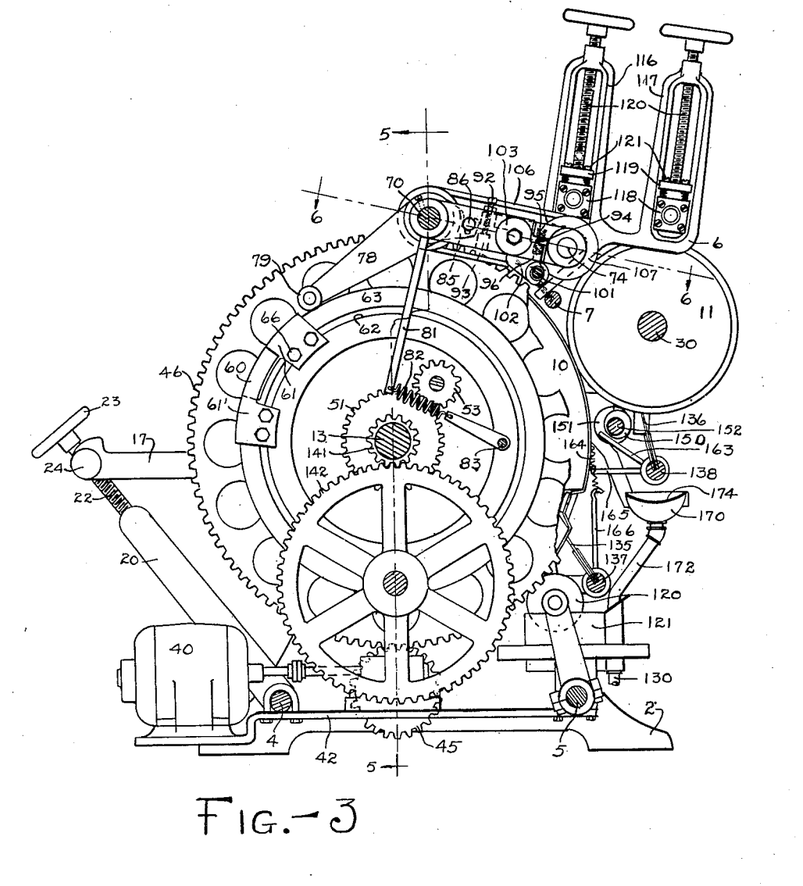
Fig. 3 is a sectional side elevation with the frame broken away.

In order to effect angular adjustment between the cam follower arm 78 and the frame arms 71 to thus vary the pressure on the blank to be fed, we provide a clamping device including a rearwardly extending arcuately slotted arm 85 which may be clamped in angularly adjusted position to one of the frame arms 71, as by a clamping bolt 86 carried by this arm 71, (see Fig. 3).

The pivotal connection between the arms 73 and the frame arms 71 may comprise bolts 90, which allow free relative angular movement of the arms. The arms 73 have forward extensions at 91 carrying adjusting screws 92 arranged in the path of fixed abutments 93 on the frame arms 71. The arms 73 which support the rollers 75 are normally held in position by compression springs, one being shown at 94, acting to separate mutually overlapping lugs 95 and 96 respectively rigid with the arms 73 and the arms 71. The action of the springs is to force the adjusting screws 92 downwardly against abutments 93. The strength of the springs is sufficient to impart the necessary movement of the cam follower to the rollers 75 to effect feeding a blank between the rollers 75 and 76, but which allows some yielding between these rolls, in case of abnormal or unexpected irregularities in the blank. The force of the springs may be varied by setting the screws 92 prior to locking the frame to the cam arm at 86 and after so locking the frame the screws 92 may be used to true the roll for equal pressure throughout its length.

Positioned between adjacent feeding roll sections 75 are stop fingers 100 mounted on a rock shaft 101 having its ends turnably mounted in the frame plates 1 and 2. The rock shaft carries a pair of arms 102 which, as shown in Fig. 4, engage the lower sides of boss members 103 at the pivotal connection between the arms 71 and 73.

When the cam 60 acts on the arm 78 to rock the feeder frame downwardly to separate the rolls 75 and 76, the bosses 103 engage the arms 102 and turn the fingers upwardly into the path of the blank. This allows the operator to shove the blank between the thus separated rolls 75 and 76 against the fingers, so that the advancing edge of the blank is accurately located with reference to the design on the transfer roll at the time when the roller 79 rides off the cam 60 to start the feeding.

The necessary rotation of one set of rolls to feed the blank may be effected by a belt drive in geared relation to the pattern roll. As shown, the rock shaft 70 has a combination gear and pulley 105, the gear being in mesh with the gear teeth 46 on the pattern roll, and the pulley driving a belt 106 which in turn drives a pulley 107 fast on the shaft 74 which carries the roll 75.

The blank or panel to be imprinted may be delivered to the rolls 75 and 76 over a series of rollers 110 carried on frame bars 111, these being adapted at one end to hook over the rock shaft 70 as by reason of slots 112. The forward ends of the bars 111 may be held up in variously adjusted positions, by means of extensible legs, one being shown at 113 comprising longitudinally slotted overlapping sections 114 and 115. This arrangement permits the feed table to be easily removed from the machine when it is desired to inspect the pattern plate, or any parts of the machine, and also permits a variable inclination of the table rollers 110.

The backing roll 12 and the upper feeding roll 76 are similarly supported in slideways formed in the members 6. For this purpose the members 6 each have two upright portions 116 and 117. These members are slotted to receive bearing blocks 118 for respective roller shafts. These blocks may be fastened to plates 119 arranged to travel in the guide slots, and to which may be swivelly connected adjusting screws 120. The blocks may be prevented from downward movement away from the plates 119 by reason of suitable screws 121, but may be urged downwardly away from the plates 119 by means of compression springs 122 interposed between the plates 119 and the bearing blocks. Upwardly yielding supports for the backing roll 12 and feeding roll 76 are thus provided. This is important in the event that individual blanks supposedly of a given thickness vary in transverse cross section, since in such event the roll 12, for example, may yield while holding the blank in close contact with the roll 11 during the entire travel.

A slight amount of play between the shafts for the rolls 12 and 76 or between the blocks 118 and their respective slideways may be provided to allow angular displacement between the axes of coacting rolls, in the event that a plate to be grained has transverse irregularities, thus maintaining even pressure entirely across the blank irrespective of such irregularities.

The pigment supply for the pattern roll includes a fountain roll 120 (see Fig. 4) and fountain tray 121, the roll being suitably driven as by a belt 122 which embraces a groove in the plate 64 on the pattern roll (see Fig. 5). The tray is supplied with liquid pigment material from a reservoir 125 (see Fig. 1), there being a pipe line at 126 leading into the tray. A constant level of pigment may be had in the tray by reason of a vertically adjustable stand pipe 127 (see Fig. 4) through which surplus pigment material is carried to a pump indicated diagrammetically at 128 and driven by a suitable motor 129. Communicating from the stand pipe to the pump is shown a horizontal stretch of pipe 130, (Fig. 1).

The pump operates to force the overflow of pigment material upwardly thru a vertical pipe 131 into the top of the reservoir 125 where it may be suitably strained before again passing to the fountain tray.

As shown in Figs. 1 and 4, the rolls 10 and 11 are provided with doctor blades 135 and 136. These blades are mounted for a horizontal reciprocation on shafts 137 and 138 respectively, their ends being suitably supported on brackets on the frame members 1 and 2. These shafts are also turnable in order to carry the blades away from the respective rolls, as will be presently shown.

We have arranged to reciprocate the doctor blades in timed relation to the rotation of the pattern roll, the arrangement preferably comprising a cam 140 geared to the pattern roll as by means of gears 141 and 142, the former being rigid on the roll shaft 13. The cam has a peripheral groove in which rides a follower 143 carried on a vertically pivoted lever 144. The lever has a rearwardly extending arm 145 which engages the grooved end 146 of the shaft 137. Reciprocation of this shaft is imparted to the shaft 138 through a horizontally pivoted lever 148 carried on the frame plate 1, the upper end of which engages a groove in the end of the shaft 138 similar to that of the shaft 137. The groove in the cam is so shaped, that the lever 144 rocks transversely of the machine, and alternately reciprocates the shafts 137 and 138 through the lever 148.

By reason of the large size of the transfer roll 11, and due to the peculiar characteristics of the transfer roll material, it is highly important that this roll be freed from standing contact with its cooperating parts. If the roll were left standing in contact with the pattern for any length of time, it would receive a permanent impression from the pattern. Likewise, if left in contact with the doctor blade, it would be permanently grooved by such contact.

We have arranged for moving the roll 11 away from the pattern roll and substantially simultaneously moving the doctor blade out of contact with the roll, the arrangement, as shown, consisting of a pair of cams 150 and 151 on a cam shaft 152 carried by the frame plates 1 and 2, and operable by means of a handle 153. The cams act on the doctor blade shaft 138 and on the swinging frame 34, the relation of the cams being such that the doctor blade is moved first. This is important mainly in the event frictional contact between the rolls is depended upon for driving the transfer roll since, then, there would be a possibility of the blade being left in contact with the standing transfer roll, even though the motor drive is continued.

As shown in Fig. 2, the frame 34 is provided with a fixed stop 160 which coacts with an adjustable stop 161 to adjustably and positively govern the movement of the transfer roll toward the pattern roll, and operation of the cam 151 on the frame 34 separates the rolls. To move the doctor blade the cam 150 operates indirectly on the shaft 138 through an arm 163 rigid with the shaft 138. The operation of the cam 150 on the shaft 138 is opposed by a tension spring 164 which acts on an arm 165 rigid with the shaft 138, and incidently on an arm 166 rigid with the doctor blade shaft 137 to hold both these doctor blades in normally operative position.

It is desirable to salvage the pigment scraped from the transfer roll by the blade 136, and to effect this, we provide a tray 170 below the doctor blade 136, which, by reason of a pipe 172 may drain either into the fountain tray or to the pump, enabling the thus salvaged pigment to be used over again. A screen 174 in the pan 170 serves to drain out impurities and caked pigment before the thus reclaimed pigment may be reused.

We claim:

1. In a machine of the class described, a pattern roll, a transfer roll, and a backing roll, supporting means for the rolls, a pair of feed rolls in parallel relation to the backing roll, a swinging frame for supporting one of said rolls, said swinging frame being pivoted to said means, a cam connected to the pattern roll for acting on the frame to swing it and separate said feed rolls in timed relation to the rotation of the pattern roll, there being a pair of arms yieldingly pivoted to the frame and forming a bearing for the movable feed roll.

2. In a machine of the class described, a pattern roll, a transfer roll, and means cooperating with the transfer roll to carry a blank into contact therewith, a support for said rolls, a pair of feeding rolls for blanks, there being a frame for supporting one of the feeding rolls, said frame being pivoted to said support, means operating in timed relation to the rotation of the pattern roll for swinging said roll carrying frame, said frame incorporating a yielding adjustment to vary the pressure of a feeding roll on the blank irrespective of uniform action of the frame swinging means.

3. In a machine of the class described, a pattern roll, a transfer roll, and means to hold a blank in contact with the transfer roll, a support for said rolls, a cam movable with one of the rolls, a lever carried by said support and having an arm coacting with the cam, a pair of feed rolls and a pair of arms adjustably fixed to the first named arm for supporting one of the feeding rolls, said pair of arms comprising pivoted sections, there being a yielding connection between the sections arranged to permit angular variation between the movable roll and the first named arm whereby the force applied to the blank may be varied irrespective of constant action of the cam on the first named arm.

4. In a graining machine, a pattern roll, a transfer roll, and a backing roll, a frame supporting said rolls, a shaft for the pattern roll, movable means for holding the shaft on the frame, and a pair of vertically swingable rails disposed below the shaft, and adjustable supporting means therefor for causing the roll to be moved by gravity in one inclined position of the rails away from the frame, and for causing the roll to approach the frame in another inclined position.

5. In a graining machine, a pattern roll, a transfer roll, and a backing roll, a frame supporting said rolls, a shaft for the pattern roll, movable means for holding the shaft on the frame and permitting it to turn, and a pair of vertically swingable rails, and adjustable supporting means therefor pivoted to the frame for supporting the roll and causing it to be moved by gravity toward and away from the shaft holding means, depending on the inclined position of the rails.

6. In a graining machine, a pattern roll, a transfer roll, and a backing roll, means for feeding a blank between the last two mentioned rolls, a frame for supporting said rolls and feeding means, a removable holder for the pattern roll, including a shaft and bearings, said holder being arranged to release the shaft, means forming peripheral grooves carried on the ends of the shaft, and a pair of vertically swingable rails engaging the grooves and arranged to support the roll while the same is being moved toward and away from the machine, the roll being guided, while on the rails, by said grooves.

7. In a machine of the class described, a pattern roll, a transfer roll, and a backing roll, a frame supporting the rolls, a pair of arms supporting the transfer roll said arms being pivoted to the frame and arranged to allow the transfer roll to yieldingly contact with the pattern roll, and means for moving said arms simultaneously to separate the transfer and pattern rolls.

8. In a machine of the class described, a frame, a pattern roll, a transfer roll, and a backing roll, means to supply pigment to the pattern roll, a movable bearing support for the transfer roll, a doctor blade acting on the transfer roll to scrape pigment therefrom, and means operatively connected to said movable support and the doctor blade, to first move the doctor blade out of contact with the transfer roll, and then separate the transfer roll from the pattern roll.

9. In a machine of the class described, a frame, a pattern roll, a transfer roll and a backing roll, carried by the frame, means to supply pigment to the pattern roll, a doctor blade acting on the transfer roll to scrape pigment therefrom, a movable support for the transfer roll arranged to allow the transfer roll to be separated from the pattern roll, a cam shaft, and means for operating the same, there being cams operatively connected to the doctor blade and transfer roll support to separate the transfer roll and pattern roll and to move the blade out of contact with the transfer roll.

10. In a machine of the class described, a pattern roll and a transfer roll, a frame on which said rolls are mounted, means to supply pigment to the pattern roll, a pair of doctor blades associated with respective rolls to scrape pigment therefrom, and means operating in timed relation to one of said rolls for reciprocating both doctor blades.

11. In a machine of the class described, a pattern roll and a transfer roll, a frame on which said rolls are mounted, means to supply pigment to the pattern roll, a pair of doctor blades associated with respective rolls to scrape pigment therefrom, a cam driven by the pattern roll, a lever having an arm coacting with the cam and oscillated thereby, and means to impart alternate movement to the doctor blades from said lever.

12. In a graining machine pattern transferring mechanism, including a transfer roll, a work feeding mechanism disposed adjacent the transfer roll, including a feed roll, and a pair of work engaging and backing rollers disposed respectively adjacent the transfer roll and feed roll, and means to individually and slidably support the rollers for considerable vertical adjustment, whereby work varying greatly in thickness may be handled on the machine.

In testimony whereof, we hereunto affix our signatures.

LLOYD V. CASTO.
GUIDO von WEBERN.